United States Patent
Shamilian et al.

(10) Patent No.: US 8,108,541 B2
(45) Date of Patent: Jan. 31, 2012

(54) METHOD AND APPARATUS FOR PROVIDING COLLABORATIVE INTERACTIVE VIDEO STREAMING

(75) Inventors: John H. Shamilian, Tinton Falls, NJ (US); Paul A. Sanitate, Lakewood, NJ (US)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/622,092

(22) Filed: Nov. 19, 2009

(65) Prior Publication Data

US 2011/0119392 A1    May 19, 2011

(51) Int. Cl.
*G06F 15/16* (2006.01)
(52) U.S. Cl. .................. 709/231; 709/230; 709/246
(58) Field of Classification Search .......... 709/230–231, 709/246
See application file for complete search history.

(56) References Cited

U.S. PATENT DOCUMENTS

| | | | | |
|---|---|---|---|---|
| 6,065,050 A * | 5/2000 | DeMoney | ..................... | 709/219 |
| 6,138,147 A * | 10/2000 | Weaver et al. | ................ | 709/206 |
| 6,343,313 B1 * | 1/2002 | Salesky et al. | ................ | 709/204 |
| 6,625,750 B1 * | 9/2003 | Duso et al. | ...................... | 714/11 |
| 6,714,986 B2 * | 3/2004 | Karibe et al. | ................ | 709/240 |
| 7,003,791 B2 * | 2/2006 | Mizutani | ....................... | 725/21 |
| 7,650,621 B2 * | 1/2010 | Thomas et al. | ................ | 725/87 |
| 7,739,715 B2 * | 6/2010 | He et al. | ......................... | 725/90 |
| 7,823,058 B2 * | 10/2010 | Pea et al. | ...................... | 715/230 |

OTHER PUBLICATIONS

S. Gupta et at., "P2P Video Synchronization in a Collaborative Virtual Environment", Advances in Web-Based Learning-ICWL 2005, 4th International Conference, Hong Kong, China, Jul. 31-Aug. 3, 2005. Proceedings, Lecture Notes in Compute Science (vol.) 3583, pp. 86-98.

* cited by examiner

*Primary Examiner* — Hussein A. Elchanti
(74) *Attorney, Agent, or Firm* — C. Bilicska

(57) ABSTRACT

True collaborative interactive video streaming is advantageously achieved in accordance with certain illustrative embodiments of the present invention. A method and apparatus in accordance with one illustrative embodiment of the present invention enables a plurality of clients to concurrently view and interactively modify the playout of a video program—which may advantageously comprise either a stored (i.e., prerecorded) video program (e.g., a movie) or a real-time (i.e., live) video program—wherein the video program is being streamed from a video server to all of the clients synchronously (i.e., the same video is being played out concurrently to all clients). In accordance with this illustrative embodiment of the present invention, each of the plurality of clients is advantageously capable of transmitting control commands to the video server, and the video server responds to such control commands by appropriately modifying the video streaming process, but does so synchronously to all clients.

24 Claims, 3 Drawing Sheets

METHOD AND APPARATUS FOR PROVIDING COLLABORATIVE INTERACTIVE VIDEO STREAMING

FIELD OF THE INVENTION

The present invention relates generally to the field of distributed video streaming and more particularly to a method and apparatus for providing distributed video streaming with multiple controls to facilitate collaboration among a plurality of users.

BACKGROUND OF THE INVENTION

Internet based video streaming has becoming much more practical since the advent of broadband networks capable of supporting the high bandwidths required for the transmission of video signals. Typically, a video server or video distribution server streams a given video—which may consist of a prerecorded video program (e.g., a movie) stored on the video server, or either a real-time (i.e., live) video program or a prerecorded video program provided to and then distributed by the video server—to a plurality of clients. This is the case, for example, in Internet video broadcasting applications such as, for example, IPTV (Internet Protocol Television). However, when a plurality of clients wish to simultaneously view a video program and to also collaborate in some endeavor related to the video program, only a separate parallel and independent interactive communication process between the clients is available for collaboration purposes. For example, the clients who wish to collaborate in an endeavor related to the video program may use a teleconference to verbally discuss the video being streamed, or may use an Internet chat to send text messages about the video to each other. In any case, they are generally unable to control the streaming of the video program about which they are collaborating.

Separately, interactive digital video recording (DVR) techniques have also become ubiquitous—typically, for use by a single individual for interactively viewing a (typically prerecorded) video program. In particular, such an individual may control the playout of the video interactively by, for example, pausing the video program, restarting (playing) the video program, rewinding the video program, and/or fast forwarding the video program, at will. Although currently, the most common environment for the use of digital video recording techniques consists of a local DVR (Digital Video Recorder) device which stores the video program locally (i.e., in the same physical location as the viewer), remote digital video recording techniques, in which a network based video server stores the video program, are becoming more common.

SUMMARY OF THE INVENTION

We have recognized that true collaborative interactive video streaming would be highly valuable and may be advantageously achieved in accordance with certain illustrative embodiments of the present invention by making use of the principles of remote digital video recording techniques in a novel, enhanced manner. In particular, in accordance with one illustrative embodiment of the present invention, a plurality of clients is able to concurrently view and interactively modify the playout of a video program—which may advantageously comprise either a prerecorded video program (e.g., a movie), which may be either stored on the video server or merely distributed by the video server, or a real-time (i.e., live) video program, which is distributed by the video server—wherein the video program is being streamed from a video server to all of the clients synchronously (i.e., the same video is being played out concurrently to all clients). In accordance with this illustrative embodiment of the present invention, each of the plurality of clients is advantageously capable of transmitting control commands to the video server, and the video server responds to such control commands by appropriately modifying the video streaming process, but does so synchronously to all clients. (As used herein, the terms "synchronous" and "synchronously" refer to the fact that each of clients is advantageously viewing the same video stream at the same time, throughout the interactive collaborative session. Thus, although only a single user may have provided a given control command, the result of that command—i.e., the modification of the video stream—is advantageously viewed by all clients concurrently.)

More specifically, in accordance with various illustrative embodiments of the present invention, a method and apparatus for streaming video from a video server to a plurality of clients is provided, wherein the method (or the apparatus) comprises steps (or a processor) which stream a video program from the video server synchronously to each of said clients; receive a sequence of control commands at the video server from the plurality of clients, the sequence of control commands comprising at least one control command from each of at least two different ones of said plurality of clients, each of said control commands representing a corresponding request to modify the streaming of said video program; and modify the streaming of the video program from the video server to each of said clients synchronously in response to each of said received control commands in said sequence thereof and in accordance with the corresponding request to modify the streaming of said video program represented thereby.

Illustratively, the control commands which may be provided by each of the plurality of clients may include a "Pause" command, a "Rewind" command, a "Fast forward" command, and a "Play" command, wherein a "Pause" command represents a request to pause the video program at a current location thereof, a "Rewind" command represents a request to rewind the video program from a current location thereof, a "Fast forward" command represents a request to fast forward the video program from a current location thereof, and a "Play" command represents a request to play the video program from a current location thereof. In addition, in accordance with certain illustrative embodiments of the present invention, the sequence of control commands received at the video server is advantageously recorded and associated with an elapsed time, for use in subsequent playback in order to recreate the collaboration session. Moreover, in accordance with certain illustrative embodiments of the present invention, an additional interactive communication process—such as, for example, a teleconference, an Internet chat, or telestration of the video program—may be advantageously performed concurrently with said streaming of said video program, and client actions performed in the additional interactive communication process may also be recorded and associated with an elapsed time, also for use in subsequent playback in order to recreate the collaboration session.

DETAILED DESCRIPTION OF THE PREFERRED EMBODIMENTS

Figure 1:
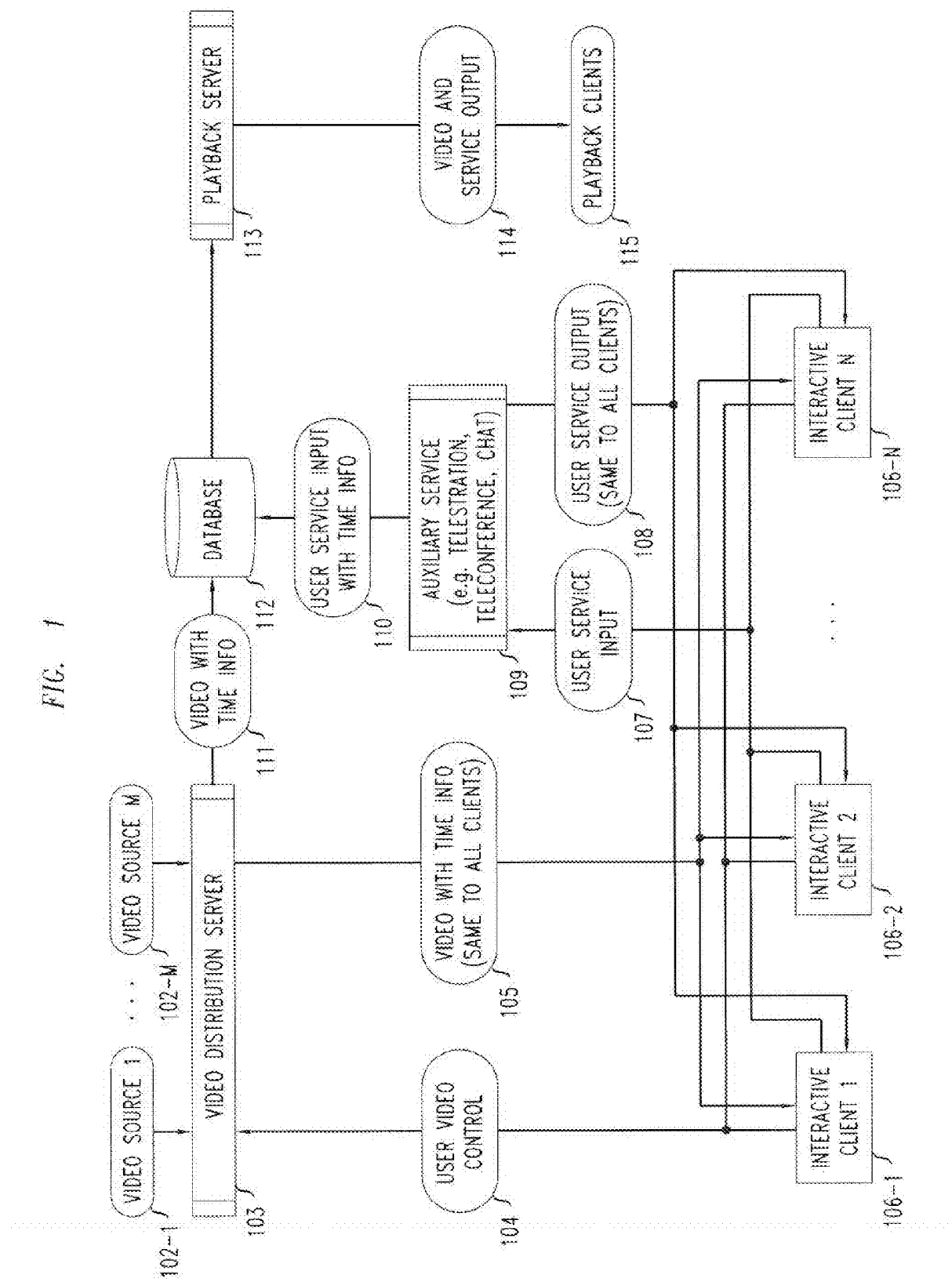
FIG. 1 shows an illustrative flow diagram of the operation of collaborative interactive video streaming in accordance with an illustrative embodiment of the present invention.

FIG. 1 shows an illustrative flow diagram of the operation of collaborative interactive video streaming in accordance with an illustrative embodiment of the present invention. In accordance with this embodiment, video distribution server 103 streams a video program, which may, for example, be selected from one of a number of possible video sources 102-1 through 102-M, to each of a plurality of interactive clients 106-1 through 106-N. Video sources 102-1 through 102-M may comprise one or more real-time live video sources (e.g., video captured directly by a video camera), and may also comprise one or more prerecorded video programs (e.g., movies). (In certain other illustrative embodiments of the present invention not shown in the figure, the video program streamed by video distribution server 103 may comprise a prerecorded video program stored within the video server itself.) In particular, in order to advantageously allow for interactive collaboration among clients 106-1 through 106-N, video distribution server 103 streams the given video program to the clients synchronously. (As used herein, the terms "synchronous" and "synchronously" refer to the fact that each of clients is advantageously viewing the same video stream at all times.)

Although FIG. 1 shows the flow associated with only a single collaboration session (i.e., all of the clients shown in the figure are synchronously viewing the same video program), video server 103 may support the concurrent operation of multiple, independent sessions (i.e., either viewing separate videos or viewing the same video but separately controlled). Moreover, a single collaboration session could comprise a set of clients synchronously viewing multiple video programs. (For example, a group of clients synchronously watching a surgical operation may be simultaneously viewing a video of the operating room, a close up video of the patient, and the output of a piece of medical equipment.) Such extensions to the illustrative embodiments described herein with reference to FIGS. 1-3 will be trivially obvious to those of ordinary skill in the art.

Specifically, as shown in FIG. 1, video stream 105 (and in accordance with certain illustrative embodiments of the present invention, optional associated time information) is streamed synchronously to each of a plurality of clients—i.e., interactive clients 106-1 through 106-N. (The associated time information may, for example, advantageously comprise an absolute time which has elapsed from the start of a predefined collaborative interactive video streaming session.) And, in accordance with the principles of the present invention, each of these clients may advantageously provide control commands (user video control 104) back to the video server in order to modify the video stream. For example, in accordance with certain illustrative embodiments of the present invention, an interactive client may provide a "Pause" command, a "Rewind" command, a "Fast forward" command, and/or a "Play" command, wherein a "Pause" command represents a request to pause the video program at a current location thereof, a "Rewind" command represents a request to rewind the video program from a current location thereof, a "Fast forward" command represents a request to fast forward the video program from a current location thereof, and a "Play" command represents a request to play the video program from a current location thereof.

Then, in accordance with the principles of the present invention and in response to the receipt of a control command, video server 103 modifies the streaming of the video program appropriately (e.g., by pausing, playing, rewinding, or fast forwarding) and streams the modified video (video stream 105) back to all of the interactive clients synchronously. In this manner, any one of the clients can issue a control command to the video server, and in response thereto, the video server will advantageously stream the same modified video to all clients.

As is also shown in FIG. 1, in accordance with certain illustrative embodiments of the present invention, the video program which is streamed to the plurality of interactive video clients is also advantageously sent along with associated time information (video stream 111) to database 112, where it is recorded (i.e., stored) for future use. In particular, at a (presumably) later time, playback server 113 may be advantageously employed to stream the video (video stream 114) to one or more playback clients 115. These playback clients will thereby be able to advantageously view the interactive collaborative session which was held (earlier) by interactive clients 106-1 through 106-N. In an alternative illustrative embodiment of the present invention, database 112 may record (i.e., store) the original video program, along with the sequence of control commands that have been received by video server 103 and associated time information therefor—i.e., the time (e.g., from the start of a predefined collaborative interactive video streaming session) at which each such control command was received by the video server. In either case, playback server 113 will be able to provide the complete interactive collaborative session to the playback client(s)—either by merely playing the stored video (as it was streamed—for example, with any pauses, plays, rewinds and fast forwards incorporated therein) or by recreating the interactive collaborative session based on the stored sequence of control commands (and their associated times).

Moreover, in accordance with certain illustrative embodiments of the present invention, as is also shown in FIG. 1, the interactive clients may advantageously engage in one or more concurrent, additional interactive communication processes (i.e., "auxiliary services"). Such an interactive communication process (i.e., an auxiliary service) may, for example, comprise a teleconference (either audio or audiovisual), an Internet chat, and/or a telestration of the video program. (As is fully familiar to those of ordinary skill in the art, telestration of a video or an image comprises enabling a user to draw on the given video or image. In other words, the drawing being created by the user—which, in the case of video, is often performed while the video has been paused—is superimposed upon the video, often for purposes of highlighting an important portion thereof.) Specifically, any one of the interactive clients may provide user service input 107 (e.g., speech in the case of an audio teleconference, text in the case of an Internet chat, or a drawing in the case of telestration) to auxiliary service 109, which, in turn, sends the combination of these user service inputs back to each of the interactive clients (user service output 108).

In addition, in accordance with certain ones of the above described illustrative embodiments in which the interactive collaborative session is recorded for future use, auxiliary service 109 advantageously provides all of the user service input associated with the auxiliary service which it has received, along with associated time information thereof (as user service input 110) to database 112. In this manner, playback clients 115 can later advantageously view the entire interactive collaborative session, including both the video stream and the communication between the interactive clients from the additional interactive communication process (i.e., the auxiliary service) as video and service output 114 from playback server 113.

Also, in accordance with certain illustrative embodiments of the present invention, a user (i.e., client) may advantageously "tag" (or bookmark) a particular video stream at a given point in time. That is, he or she may advantageously record the specific location (e.g., the video frame number) of a video program currently being displayed. Similarly, in the case where the collaboration session comprises the viewing of multiple synchronized video programs, he or she may advantageously "tag" all (or any subset of all) of the video programs that are being displayed at the given point in time. Then, at some later point in time, the user (or, for that matter, any other user participating in the interactive collaborative session) may advantageously request that video server 103 modify the streaming of the video program(s) to move to such a previously tagged location. Moreover, in accordance with certain other illustrative embodiments of the present invention, a user (i.e., client) may advantageously "tag" (or bookmark) a particular point in time within the collaborative interactive video streaming session. Thus, the state (e.g., location) of the video program(s) being displayed together with the conditions of any concurrent "auxiliary services" at the given point in time which was previously "tagged" may later be advantageously retrieved.

As is well known to those of ordinary skill in the art, remote digital video recording techniques, in which a network based video server stores the video program but a (single) client controls the playback thereof, are typically implemented with use of the transmission control protocol known as RTSP (Real Time Streaming Protocol), which runs "on top of" the conventional Internet Protocol (IP). This conventional (and well known) RTSP protocol provides a mechanism for communicating control commands from the (single) client to the video server and for streaming the video program back to the (single) client in response thereto. In accordance with one illustrative embodiment of the present invention, therefore, a modified version of RTSP may be advantageously employed to stream a video program synchronously to a plurality of clients and to communicate control commands from multiple ones of those clients back to the video server. In accordance with other illustrative embodiments of the present invention, however, alternative transmission control protocols running on top of an Internet Protocol (IP) may be employed.

Figure 2:
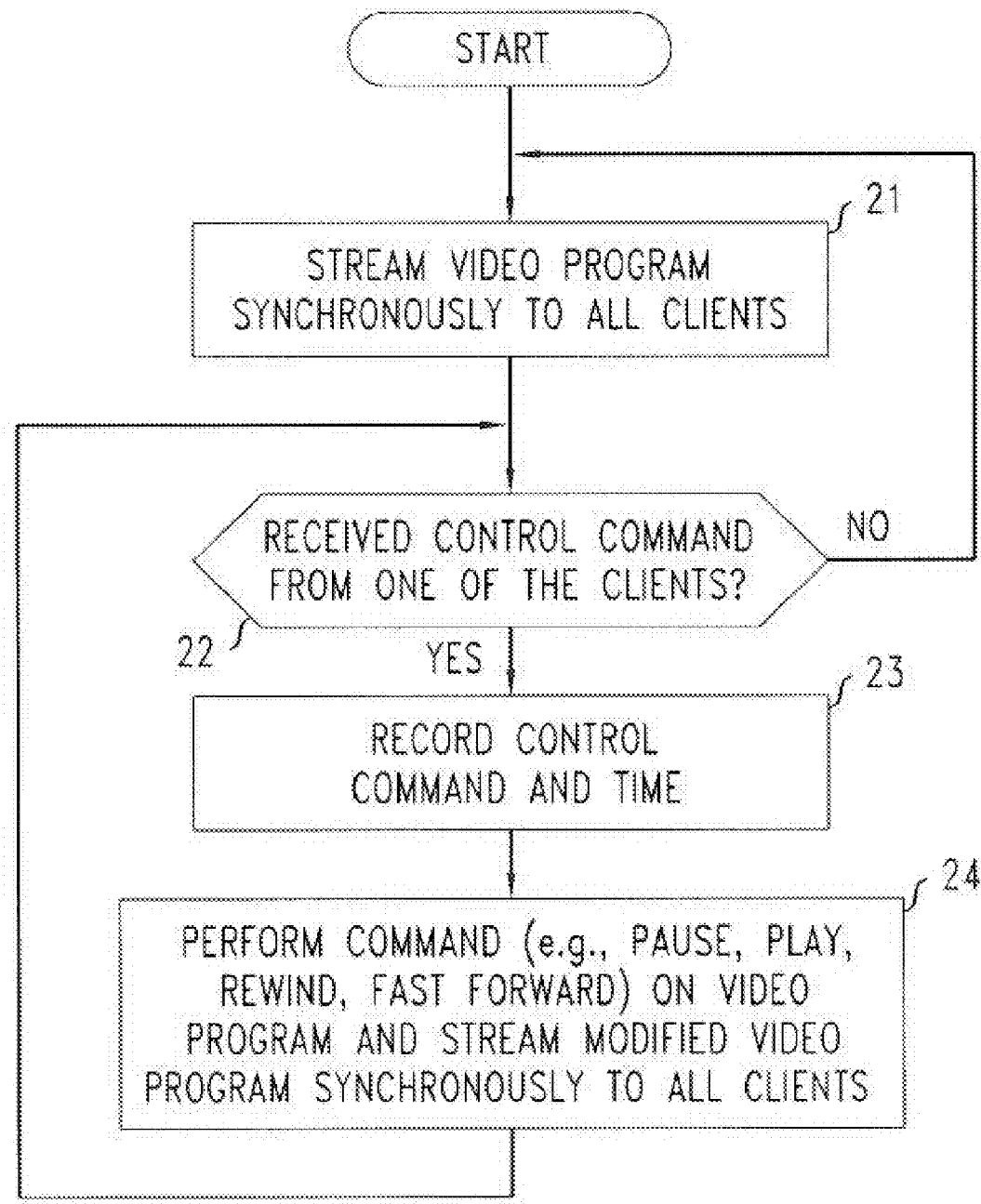
FIG. 2 shows an illustrative flowchart of the operation of a video server for use in collaborative interactive video streaming in accordance with an illustrative embodiment of the present invention.

FIG. 2 shows an illustrative flowchart of the operation of a video server for use in collaborative interactive video streaming in accordance with an illustrative embodiment of the present invention. In accordance with this illustrative embodiment, which may be performed by a video server, a video program is (continuously) streamed synchronously to each one of a plurality of clients (as shown in flowchart box 21). Then, upon receipt of a control command from one of the clients (as determined in flowchart decision box 22), the control command is advantageously recorded, along with an associated time, in a database (as shown in flowchart box 23), and the video server performs the given command (e.g., pause, play, rewind, or fast forward) on the video program and streams the (modified) video program synchronously to all of the clients (as shown in flowchart box 24). Finally, flow returns to flowchart decision box 22 to check for the receipt of additional control commands.

Figure 3:
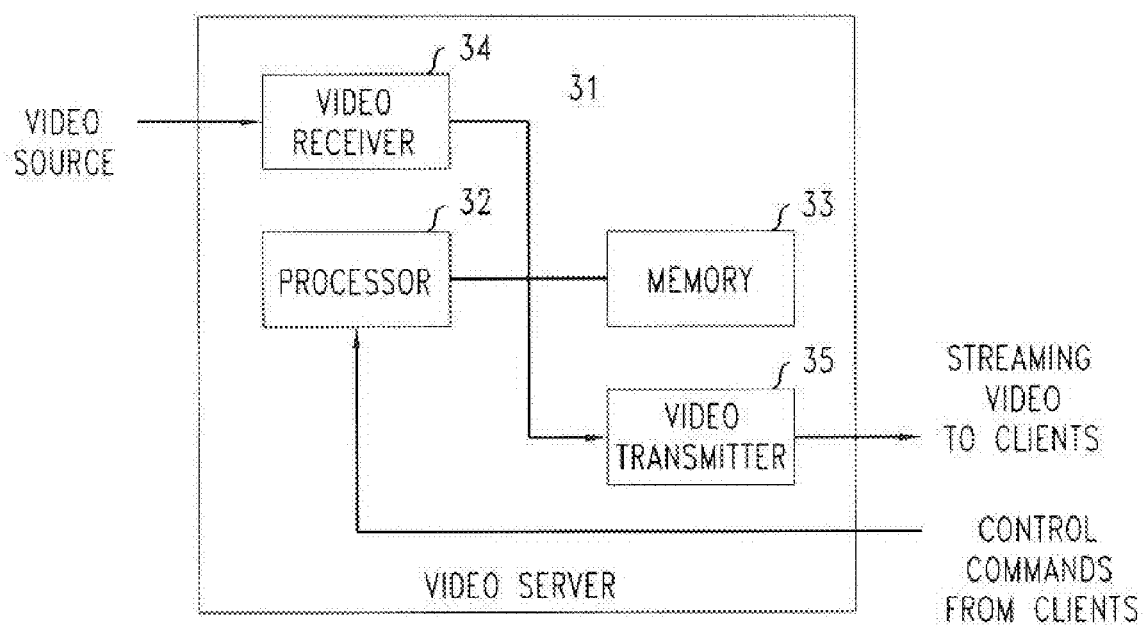
FIG. 3 shows an illustrative block diagram of a video server for use in collaborative interactive video streaming in accordance with an illustrative embodiment of the present invention.

FIG. 3 shows an illustrative block diagram of a video server for use in collaborative interactive video streaming in accordance with an illustrative embodiment of the present invention. In accordance with this illustrative embodiment of the present invention, video server 31 comprises processor 32, memory 33, video receiver 34 and video transmitter 35. Specifically, video receiver 34 receives a video source signal, which may, for example, have been selected from a plurality of video source signals (such as, for example, video sources 102-1 through 102-M as shown in FIG. 1), and video transmitter 35 streams the video program to each of the plurality of clients being supported by video server 31 and participating in the given collaborative interactive video session.

In operation of video server 31 of FIG. 3 in accordance with this illustrative embodiment of the present invention, video transmitter 35 streams the video program (as received by video receiver 34) synchronously to all of the clients supported thereby and participating in the given collaborative interactive video session. Then, however, processor 32 receives a sequence of control commands (from various ones of the plurality of clients), and in response thereto, advantageously modifies the streaming of the video program in accordance therewith (e.g., by pausing, playing, rewinding, and/or fast forwarding the video program), which video transmitter 35 then advantageously streams synchronously to each of the clients.

Note that in accordance with other illustrative embodiments of the present invention, one of more video source programs may be stored locally in video server 31 of FIG. 3 (such as, for example, in memory 33), rather than retrieved by video receiver 34 from an external source. If, however, the video program has been retrieved from an external source by video receiver 34, the video program may then be advantageously stored in memory 33 in order to enable the functionality (e.g., pause, play, rewind, and/or fast forward) as requested by the received control commands.

Addendum to the Detailed Description

The preceding merely illustrates the principles of the invention. It will thus be appreciated that those skilled in the art will be able to devise various arrangements which, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

A person of ordinary skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as magnetic disks and magnetic tapes, hard drives, or optically readable digital data storage media. The embodiments are also intended to cover computers programmed to perform said steps of the above-described methods.

The functions of any elements shown in the figures, including functional blocks labeled as "processors" may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. A method of streaming video from a video server to a plurality of clients, the method comprising:
   streaming a video program from the video server synchronously to each of said clients;
   receiving a sequence of control commands at the video server from the plurality of clients, the sequence of control commands comprising at least one control command from each of at least two different ones of said plurality of clients, each of said control commands representing a corresponding request to modify the streaming of said video program;
   modifying the streaming of the video program from the video server to each of said clients synchronously in response to each of said received control commands in said sequence thereof and in accordance with the corresponding request to modify the streaming of said video program represented thereby;
   establishing a starting time for a video streaming session; and
   recording the sequence of control commands received at the video server and associating with each control command in said sequence a corresponding elapsed time from said starting time.

2. The method of claim 1 wherein the control commands include one or more of a "Pause" command, a "Rewind" command, a "Fast forward" command, and a "Play" command, wherein a "Pause" command represents a request to pause the video program at a current location thereof, a "Rewind" command represents a request to rewind the video program from a current location thereof, a "Fast forward" command represents a request to fast forward the video program from a current location thereof, and a "Play" command represents a request to play the video program from a current location thereof.

3. The method of claim 1 wherein the control commands further include a "tag" command, wherein the "tag" command represents a request to bookmark a current location of the video program or a current point in time.

4. The method of claim 1 further comprising performing an additional interactive communication process between two or more of said clients concurrently with said streaming of said video program.

5. The method of claim 4 wherein the additional interactive communication process comprises a teleconference.

6. The method of claim 4 wherein the additional interactive communication process comprises an Internet chat.

7. The method of claim 4 wherein the additional interactive communication process comprises telestration of said video program.

8. The method of claim 4 further comprising:
   recording one or more actions performed by at least one of said clients performing said additional interactive communication process, and associating with each of said actions a corresponding elapsed time from said starting time.

9. The method of claim 1 wherein the control commands have been transmitted from said plurality of clients to said video server with use of a transmission control protocol running on top of an Internet Protocol (IP).

10. The method of claim 9 wherein the transmission control protocol is based on a Real Time Streaming Protocol (RTSP).

11. The method of claim 1 wherein the video program comprises a prerecorded video program.

12. The method of claim 1 wherein the video program comprises a live video program, the method further comprising:
   recording the live program at the video server.

13. An apparatus comprising a video server for streaming video from the video server to a plurality of clients, the apparatus comprising a processor, wherein the processor:
   streams a video program from the video server synchronously to each of said clients; and
   receives a sequence of control commands at the video server from the plurality of clients, the sequence of control commands comprising at least one control command from each of at least two different ones of said plurality of clients, each of said control commands representing a corresponding request to modify the streaming of said video program,
   wherein the processor further modifies the streaming of the video program from the video server to each of said clients synchronously in response to each of said received control commands in said sequence thereof and in accordance with the corresponding request to modify the streaming of said video program represented thereby; and wherein a starting time for a video streaming session has been established, and wherein the processor further records the sequence of control commands received at the video server and associates with each control command in said sequence a corresponding elapsed time from said starting time.

14. The apparatus of claim 13 wherein the control commands include one or more of a "Pause" command, a "Rewind" command, a "Fast forward" command, and a "Play" command, wherein a "Pause" command represents a request to pause the video program at a current location thereof, a "Rewind" command represents a request to rewind the video program from a current location thereof, a "Fast forward" command represents a request to fast forward the video program from a current location thereof, and a "Play" command represents a request to play the video program from a current location thereof.

15. The apparatus of claim 14 wherein the control commands further include a "tag" command, wherein the "tag" command represents a request to bookmark a current location of the video program or a current point in time.

16. The apparatus of claim 13 wherein the processor further enables two or more of said clients to perform an additional interactive communication process concurrently with said streaming of said video program.

17. The apparatus of claim 16 wherein the additional interactive communication process comprises a teleconference.

18. The apparatus of claim 16 wherein the additional interactive communication process comprises an Internet chat.

19. The apparatus of claim 16 wherein the additional interactive communication process comprises telestration of said video program.

20. The apparatus of claim 16 wherein the processor further records one or more actions performed by at least one of said clients performing said additional interactive communication process, and associates with each of said actions a corresponding elapsed time from said starting time.

21. The apparatus of claim 13 wherein the control commands have been transmitted from said plurality of clients to said video server with use of a transmission control protocol running on top of an Internet Protocol (IP).

22. The apparatus of claim 21 wherein the transmission control protocol is based on a Real Time Streaming Protocol (RTSP).

23. The apparatus of claim 13 wherein the video program comprises a prerecorded video program.

24. The apparatus of claim 13 wherein the video program comprises a live video program, and wherein the processor further records the live program at the video server.

* * * * *